Dec. 25, 1962   J. D. FREEMAN ET AL   3,069,901
FUEL MILEAGE METER FOR AUTOMOBILE OR THE LIKE
Filed April 28, 1958                       3 Sheets-Sheet 1
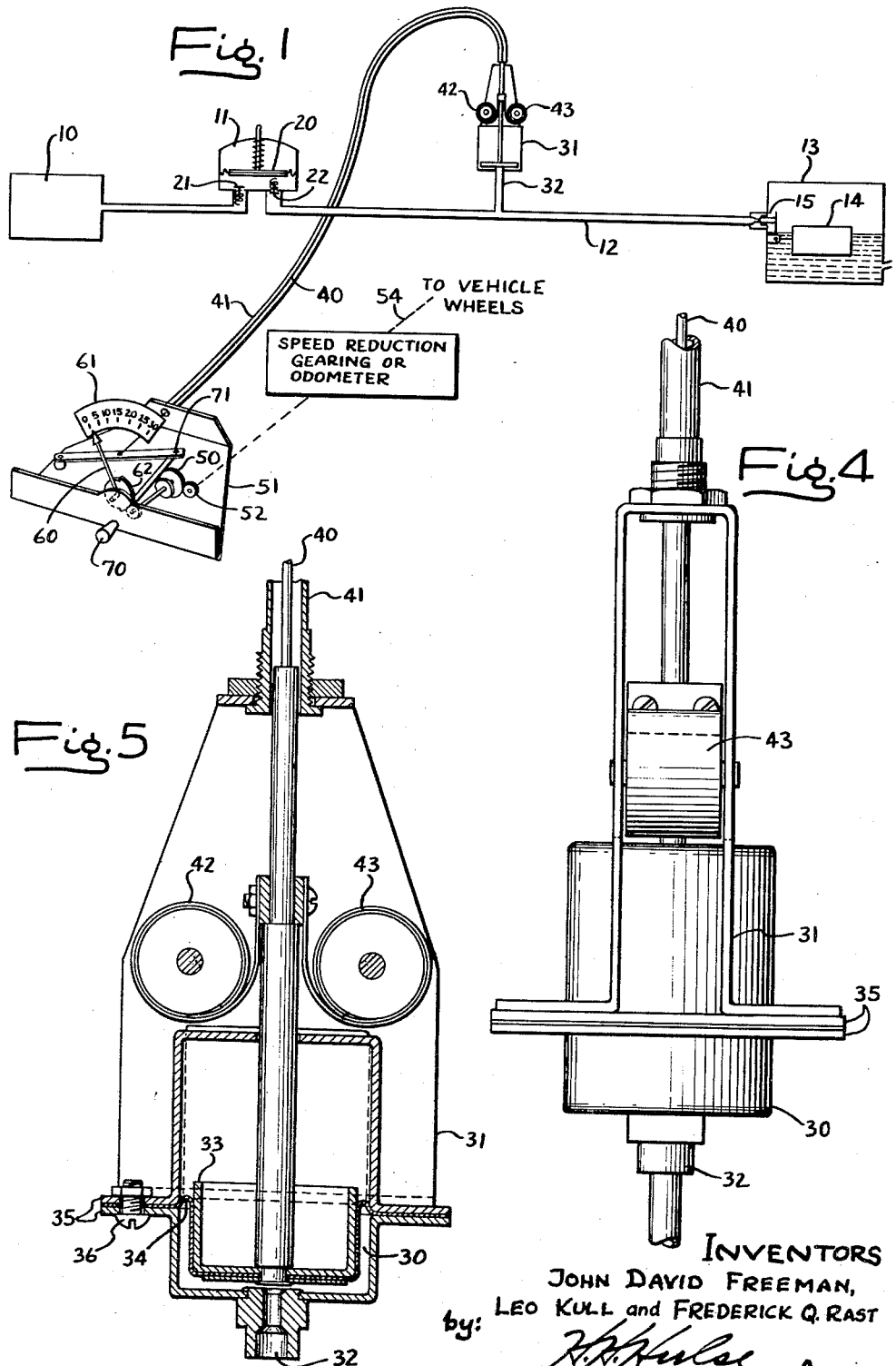
INVENTORS
JOHN DAVID FREEMAN,
LEO KULL and FREDERICK Q. RAST
by: H.H.Hulse  ATTY.

Dec. 25, 1962  J. D. FREEMAN ET AL  3,069,901
FUEL MILEAGE METER FOR AUTOMOBILE OR THE LIKE
Filed April 28, 1958  3 Sheets-Sheet 2
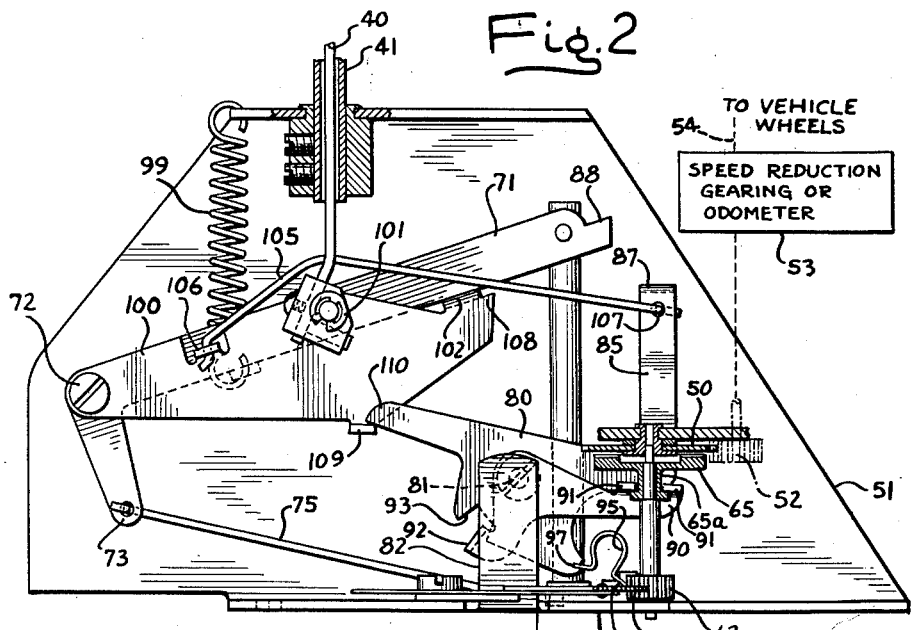
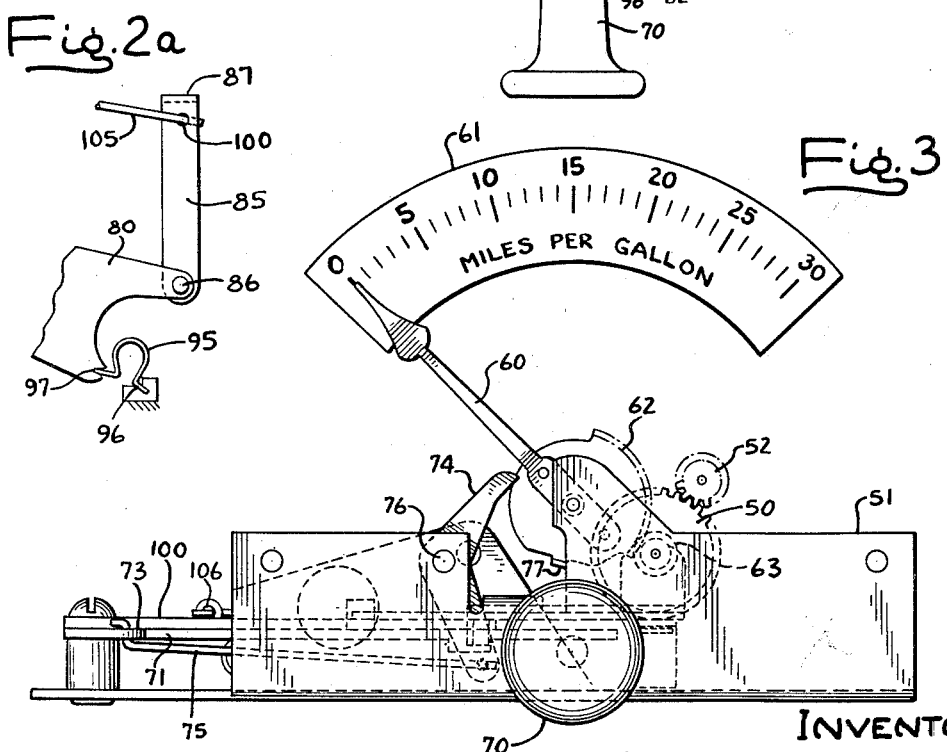
INVENTORS
JOHN DAVID FREEMAN,
LEO KULL and FREDERICK Q. RAST
by:
ATTY.

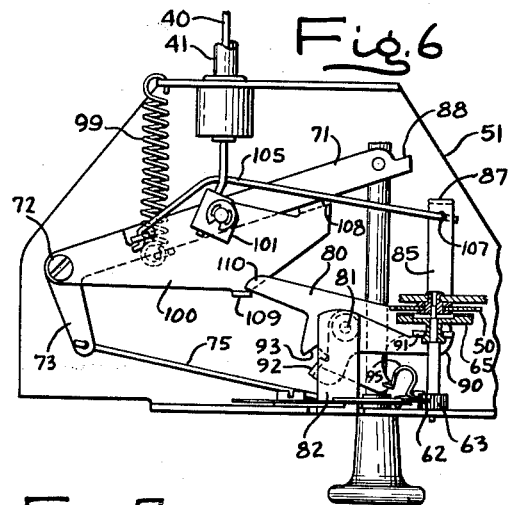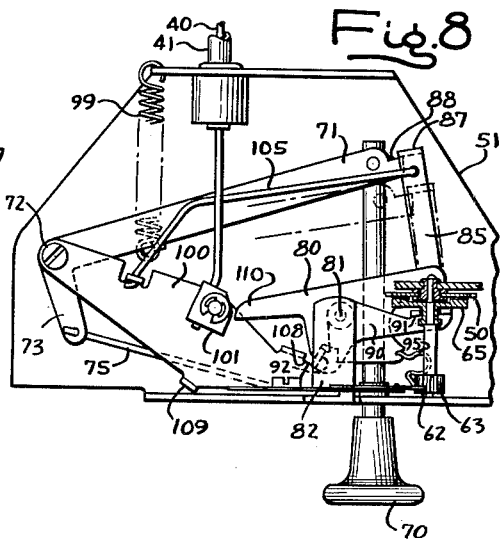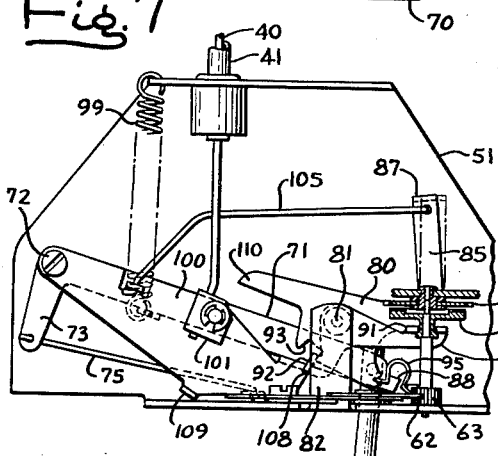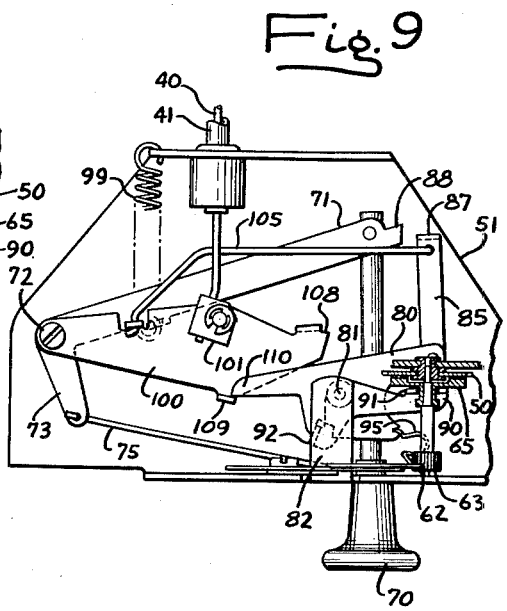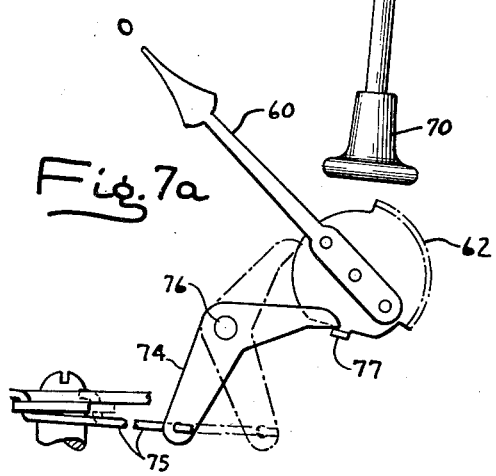

though the invention has been described in connection

United States Patent Office 3,069,901
Patented Dec. 25, 1962

3,069,901
FUEL MILEAGE METER FOR AUTOMOBILE
OR THE LIKE
John David Freeman, Forest Hills, N.Y., Leo Kull, Jersey City, N.J., and Frederick Q. Rast, New York, N.Y., assignors to General Time Corporation, New York, N.Y., a corporation of Delaware
Filed Apr. 28, 1958, Ser. No. 731,268
5 Claims. (Cl. 73—113)

The present invention relates to an accessory device for measuring fuel economy, in miles per gallon of fuel, on a continuous sampling basis.

It is known that fuel economy may vary over wide limits depending upon the condition of the engine and the operating conditions. The recent tendency toward engines of high horsepower and therefore high fuel consumption make it more desirable than ever to know that the engine is operating efficiently and to know the particular vehicle speed which should be maintained for most efficient and economical transportation under the various driving conditions which may be encountered. In the past it has not been possible to secure this information except over long periods, as for example, by dividing the traversed distance by the fuel which is added to the tank between successive "full tank" conditions. The alternative has been to use relatively expensive and complicated instrumentation or test setups of an inconvenient, temporary nature. Where instruments requiring continuous measurement of flow are used, inherent accuracy has been low.

Accordingly it is an object of the present invention to provide a fuel measuring device which is almost instantaneous in operation, giving the desired miles per gallon information in a matter of a few seconds, enabling samplings of fuel economy to be taken under all conceivable driving conditions.

It is another object to provide a fuel mileage measuring device which is of high inherent accuracy, depending upon measurement of fluid displacement rather than measurement of the rate of fluid flow.

It is a further object to provide a fuel mileage meter which is inexpensive, durable and trouble-free and thus ideally suited for use as an accessory in a conventional automobile in the same manner that a speedometer is now employed. It is, moreover, an object to provide a device of the above type which is easy to use and which may be reliably employed by one having no previous knowledge or instruction.

It is still another object to provide a fuel mileage measuring device which is of universal application in that it may be installed in any automotive fuel system without in anyway affecting the operation of such system. It is a related object to provide a device of this type which may be either installed at the factory as a new car option or which may be added at low cost to an automobile not so equipped. In the latter connection it is an object to provide a measuring device which requires the making of only two connections, one a T connection to the main fuel line and the other a drive connection to the regular vehicle speedometer cable or odometer.

Other objects of the invention will become apparent upon reference to the attached detailed description and upon reference to the drawings in which:

FIG. 1 is a simplified diagram showing the present device installed in a conventional automotive fuel system.

FIG. 2 is a plan view of a mechanism incorporating the invention.

FIG. 2a is a fragment showing the connection between the clutch operator lever and its latch.

FIG. 3 is a front view corresponding to FIG. 2.

FIGS. 4 and 5 are respectively a side view and transverse section of a fuel measuring unit employed in carrying out the invention.

FIG. 6 shows the mechanism of FIG. 2 under idle conditions.

FIG. 7 is a stop motion view showing the condition of the mechanism following the pulling of the operating plunger.

FIG. 7a is a fragmentary view showing the resetting mechanism restored to zero incident to the operation performed in FIG. 7.

FIG. 8 is a further stop motion view showing operation incident to the release of the operating plunger.

FIG. 9 is a stop motion view showing operation at the end of the operating cycle and just prior to restoration of the mechanism to the idle condition shown in FIG. 6.

While the inventtion has been described in connection with a single embodiment, we wish it understood that we do not intend to limit the invention to such embodiment but intend to cover all equivalent and alternative constructions which may be included within the spirit and scope of the claims appended hereto.

Turning now to the drawings, FIG. 1 shows a typical fuel supply system employed in an automobile comprising a fuel tank 10, a fuel pump 11, a pressurized fuel line 12, and a carburetor 13. The carburetor 13 has a float 14 and float valve 15 so that fuel is admitted to the carburetor whenever the level of fuel therein drops to a predetermined level due to consumption by the automobile engine.

The fuel pump 11 is of conventional design having a reciprocating plunger or diaphragm 20, an inlet valve 21 and an outlet or check valve 22. The fuel pump is so constructed that in the usual installation a pressure of about 4½ to 6½ pounds per square inch is maintained in the fuel line 12. This pressure at the minimum, is effective to positively force fuel to the carburetor so that when the carburetor calls for fuel by opening of the float valve 15, immediate replenishment takes place. On the other hand, the fuel pump is so arranged that it is incapable of supplying fuel above a certain pressure, in the present instance, about 6½ pounds, so that there is no tendency for the float valve 15 to be forced or overpowered by the pressure of the fuel in the line. Thus while the fuel pump operates continuously, being driven by the vehicle engine, it is only effective to supply fuel to the line when the line pressure drops below the pressure for which it has been set, either by reason of momentary demand at the carburetor or for some other reason.

In accordance with the present invention a fuel measuring chamber is connected to the fuel line 12 with means for discharging fuel from the chamber at a pressure which is greater than the pressure provided by the fuel pump, and means are provided for measuring the distance which the vehicle has traversed during the period that fuel is fed from said chamber, with convenient calibration of the measuring means in terms of distance per unit of fuel, i.e., miles per gallon. In the present instance the fuel measuring chamber, shown in FIGS. 4 and 5, comprises a cylinder 30 mounted in a frame 31 and having an orifice 32. Mounted for reciprocation within the cylinder is a fuel control means here shown as a piston 33 of cup shape having a flexible diaphragm 34, the periphery of which is sealingly secured between flanges 35 forming a part of the frame 31 and held together with suitable screws 36. For operating the piston 33 for the sucking of fuel into the measuring chamber and also for coupling the measuring unit to the remainder of the mechanism, an operating cable 40 is provided in the form of a wire reciprocable in an enclosure or sleeve 41. As best shown in FIG. 1 the orifice 32 is connected to the fuel line by means of a T connection which places the chamber 31 in parallel with the carburetor 13. With this arrangement, the fuel pump immediately compensates for any drop of fuel line pressure which occurs when fuel is sucked into the measuring chamber. In accordance with one of the aspects of the invention constant force or negator springs 42, 43 are provided for biasing the piston in the discharge direction and for applying a substantially constant force to the fuel in the line 12 which is a small amount greater than the force rating of the fuel pump. In other words, the constant force springs 42, 43 supply fuel to the fuel line 12 at a pressure which is sufficient to keep the check valve 22 located at the fuel pump in the closed position. The springs may, for example, be calibrated to supply fuel to the fuel line at a pressure on the order of a pound or two greater than the rating of the fuel pump, in the present instance, say, eight pounds per square inch. The pressure is nevertheless less than that which will tend to force fuel past the float valve 15; so that the float valve retains control, adding fuel as necessary to replenish the carburetor, but such fuel is supplied from the measuring chamber, as needed, exclusively and not from the fuel pump 11 while the springs are in operation.

Turning to FIGS. 2 and 3 attention will next be given to the means provided for measuring the elapsed distance. In the present instance such means includes a rotating element or gear 50 which is mounted in a frame 51 secured to the dashboard of the automobile. The rotating element 50 is driven by a pinion 52 which in turn is coupled to speed reduction gearing 53 having an input 54 connected to one of the wheels of the vehicle. In order to indicate the angular displacement of the rotating element 50, a pointer 60 is used cooperating with a scale 61 which may be conveniently calibrated in terms of miles per gallon as shown. The pointer 60 is mounted on a sector gear 62 driven by a pinion 63. Interposed between the drive pinion 63 and the rotating element previously referred to is a clutch member 65 which is coaxial therewith. The clutch member 65 is arranged for axial movement between an engaged position, in which the member is frictionally coupled to the rotating member 50, and a retracted position, shown in FIG. 2, in which the two members are out of engagement.

To set the device into operation, a manual plunger or operator is provided which includes means for setting the indicator to zero. The manual plunger employed in the present device is indicated at 70 and is pinned at its inner end to a plunger lever 71. The latter is of L shape, pivoted at 72, and having an arm 73. As shown in FIG. 3, the arm 73 is coupled to a zero setting lever 74 by means of a link 75. The zero setting lever is centrally pivoted at 76. As a result of this linkage, when the manual plunger is pulled out the link 75 is drawn to the left thereby rocking the zero setting lever 74 clockwise. This causes the upper end thereof to be moved into engagement with a suitable lug 77 formed on the sector gear 62 (FIG. 7a.) Thus the sector gear and is attached pointer 60 are rotated counter-clockwise to a reference position at which the pointed 60 indicates zero miles per gallon.

In the practice of the present invention means are provided (1) for triggering the clutch 65 to the closed position when the measuring unit is completely filled with fuel and (2) for disengaging the clutch, thereby terminating further movement of the indicator 60, when the fuel in the measuring unit has been consumed. In the present instance operation of the clutch between the open and closed positions is brought about by a clutch operating lever 80 which is mounted on a central pivot 81 secured to a bracket 82. Connected to the right hand end of the lever 80 (see FIG. 2a) is a clutch operating latch 85 pivoted to the lever at a pivot 86 and having a bent over tab or abutment 87 at its end. For the purpose of hookingly engaging the latch member 85 and for drawing it inwardly, i.e., away from the face of the mechanism, a hook 88 is provided at the tip of the plunger lever 71.

However, prior to describing the operation of the latch 85, more specific mention may be made to the means for coupling the clutch lever 80 to the clutch. First of all it should be noted that the clutch lever 80 is not connected to the clutch directly. Instead, in order to provide snap action, an auxiliary lost motion lever 90 is provided, pivoted at the pivot pin 81 and having a fork 91 at its outer end for engaging the clutch member 65. Specifically, the fork 91 is made up of two transversely spaced tabs engaging an annular groove 65a formed in the hub of the clutch member 65. Thus movement of the fork axially with respect to the clutch member 65 moves the clutch member in one direction or the other. For the purpose of providing engagement between the clutch operating lever 80 and the lost motion lever 90 while permitting lost motion between them, the lost motion lever has a transversely bent tab 92 at its left hand end registering with a notch 93 in the operating lever. Snap action is brought about by an over-center toggle spring 95 which is mounted in the frame of the device at 96 and the other end of which is received in a suitable notch 97 formed in the lever 80.

Thus it will be apparent that when the plunger moves inwardly either as a result of manual pressure or in response to the tensile force of a return spring 99 connected to the plunger lever 71, the accompanying movement of the clutch operating latch (assuming engagement occurs between them at 87, 88) serves to impart counter-clockwise rotation to the clutch operating lever 80 thereby compressing the spring 95 and causing it to snap over-center, taking up the lost motion and carrying with it the lost motion lever 90, and with the fork on the end of the lever 90 causing the clutch member 65 to be moved into engagement with the rotating gear 50 adjacent to it.

In carrying out the invention, and by way of qualification of the above, means are provided for causing the latch 85 to be effective only when the measuring unit is completely filled with fuel. For this purpose, and for a further purpose to be described, an operating arm 100 is provided which is rigidly coupled to the control cable 40 by means of a pivoted anchorage 101, with the operating arm lying adjacent to the plunger lever 71 and pivoted on a common pivot 72. In order that tension may be applied to the operating cable 40 when the plunger is pulled outwardly, the operating arm 100 has an abutment 102 in the form of a transversely bent tab which lies in the path of movement of the plunger lever. Normally, the latch 85 is positioned, as shown in FIG. 2, so that it lies slightly outside of the radius of movement of the hook 88 on the plunger lever. However, a link 105 is provided between the operating arm and the latch 85, the ends of the link being received in holes 106, 107, respectively, so that when the operating arm is rotated forwardly into the "fill" position by the plunger, the link 105 is drawn to the left thereby swinging the latch 85 into an interfering position with respect to the latch operating hook 88. Thus, briefly stated, when the measuring unit is filled with fuel the latch 85 is conditioned for clutch operating movement, which movement occurs upon the subsequent inward movement of the manual plunger.

To further insure that the latch 85 is activated only when the fuel measuring unit is completely full, means are provided for latchingly retaining the operating arm 100 at the end of its forward stroke so that the plunger and the plunger lever may return to their inward position independently of the operating arm. In the present instance this latching is brought about by providing a hook 108 at the tip of the operating arm and located at such radius as to engage behind the abutment 92 formed on the lost motion lever 90. Further mention will be made of this latching of the operating arm 100 in connection with FIG. 7 of the drawings. It will suffice at this point to say that such latching, signalling and filling of the measuring unit, holds the latch 85 in the active position to be operated upon the return stroke of the plunger.

Means are further provided for causing the clutch operating lever to be rotated clockwise, i.e., in the clutch opening direction, as soon as all of the fuel has been discharged from the measuring unit. It will be understood that as the fuel is discharged by the pressure exerted by springs 42, 43 (FIG. 5), corresponding gradual movement of the operating cable 40 takes place in a direction to swing the operating arm counterclockwise as viewed in FIG. 2. As the cable approaches its limit of movement, corresponding to the limit of movement of the piston 33 in the measuring unit, means are provided on the operating arm for engaging the clutch operating lever 80 in order to snap the latter clockwise in a clutch disengaging direction. In the present instance this is brought about by providing an operating lug 109 along the forward edge of the operating arm and by providing an extension 110 on the clutch operated lever 80 arranged in the path of movement of such lug. Thus, exhaustion of fuel in the measuring unit is accompanied by interference between the elements 109, 110 which produces clutch disengaging movement of the operating lever 80 in order to terminate the operating cycle. The indicator pointer 60 is thereby deposited in a position, with respect to the scale 61, which denotes the distance covered during the consumption of the fuel in the measuring unit, calibration of the scale being directly in terms of miles per gallon.

While the operation of the device will be apparent to one skilled in the art upon review of the above detailed description, nevertheless to facilitate understanding a typical operating cycle will be explained in terms of stop motion views, FIGS. 6 to 9 inclusive. At the outset it will be understood that the pointer 60 occupies a position on the scale depending upon the last measurement that was taken. Otherwise the parts are shown as set forth in FIG. 6 and with the measuring unit completely discharged as shown in FIG. 5. To take a measurement, the operator simply pulls out the plunger 70 to its limit of movement as shown in FIG. 7. The only instruction which need be given on this may be in the form of a legend adjacent the plunger, for example, "Pull plunger all of the way out; then press all of the way in." Normally there will be a certain amount of resistance to the outward movement of the plunger since during such movement fuel is being sucked into the measuring chamber 30 from the fuel line 12 and since the force of the springs 42, 43 and 99 must be overcome. Any tendency toward a drop in pressure in the fuel line is immediately compensated by discharge of fuel from the fuel pump 11, thereby maintaining line pressure. Also during outward movement of the plunger, clockwise rotation of the zero setting lever 74 occurs by reason of the pull on link 75, thereby restoring the pointer to zero. When the plunger is all of the way out, the operating arm 100, and particularly the hook portion 108 at the end thereof, slips past the abutment 92, becoming latched in the position shown. This movement of the operating arm to the latched position is accompanied by lateral movement of the latch 85 (from the dotted to the full position in FIG. 7), thereby activating the latch for actuation upon return movement of the plunger.

Upon pushing the plunger inwardly, or upon simply releasing it in the event that a return spring 99 is employed, the hook 88 at the end of the plunger lever 71 catches the latch 85 drawing it rearwardly, from dotted to full position, as shown in FIG. 8. This latch movement is accompanied by rotation of the clutch operating lever 80 which snaps over-center in a counterclockwise direction, thereby accomplishing three separate effects. In the first place, the rotation causes the abutment 92 to swing out of the hook portion 108 at the end of the operating lever. This frees the operating lever for movement of the cable 40 and connected plunger 33 under the influence of the springs 42, 43 in the measuring unit. Simultaneously the clutch is snapped closed, coupling the pointer to the wheels of the vehicle through the suitable reduction gearing or odometer 53, beginning the operating cycle. Subsequently, after the operating arm has rotated through a small arc, the latch 85, by reason of the resulting endwise movement of the link 105 is restored to the disengaged position freeing the plunger lever for movement to its seated position (see FIG. 9) in readiness for a subsequent operating cycle.

It should be noted in connection with FIG. 8 that while the operating arm 100 is released, its movement is not necessarily gradual and continuous. On the contrary, movement may be considered to take place in a series of small increments, with fuel being discharged into the fuel line 12 only as fuel may be called for by the float valve 15 in the carburetor 13. And, since the springs 42, 43 in the measuring unit create a pressure in the fuel line 12 which is about the normal pressure of the fuel pump, the check valve 22 in the fuel pump is maintained in the closed position and the fuel pump is thereby made temporarily inactive till the test is completed.

Finally, as the fuel from the measuring unit is consumed, the operating arm 100 will swing into the end position illustrated in FIG. 9. Here abutment 109 engages the left hand end 110 of the clutch operating lever 88 swinging the latter clockwise until it snaps over-center by reason of the snap action spring 95. This causes the clutch to be disengaged, thereby terminating the operating cycle. The pointer 60 is deposited at some point along the scale 61 indicating miles per gallon directly.

It is one of the features of the present device that only a small but measured amount of fuel passes through the measuring unit so that the desired information may be obtained immediately, i.e., within a few seconds. This enables the device to be used on a continuous sampling basis for any desired condition of operation of the vehicle. For example, if it is desired to know the fuel economy at any given speed, it is sufficient to hold the vehicle at such speed for a few seconds until the information is obtained following which the vehicle may be held at a different speed. In this way it is possible to quickly arrive at a compromise speed, a speed which will provide efficient transportation combined with good fuel economy. The rapidity with which measurement may be made also permits the device to be used under unusual circumstances as, for example, ascending or descending a hill or during a condition of acceleration in a selected speed gear. The results indicate quickly even to an inexperienced operator whether or not the engine is performing efficiently and the driving conditions which will provide the desired economy. Because of the savings in fuel which can be effected, the present device can be depended upon to pay for itself within a relatively short period after it is installed.

As will be apparent to one skilled in the art, since measurement depends upon positive displacement of a predetermined sample of fuel, the inaccuracies usually associated with continuous, low volume measuring devices are eliminated. Instead, highly accurate results may be achieved using parts of low tolerance which may be simply and inexpensively made and assembled. And, in spite of the fact the device performs a computing function, only a minimum number of parts are employed, substantially fewer, for example, than employed in the cheapest alarm clock. Accordingly the device may be used as an inexpensive factory option, only two connections being required, one a simple T connection to the regular fuel line and the other a connection to the vehicle wheels which may be made through the already installed speedometer cable. Access to the cable may be had, again, through a simple T connection, with suitable step down in speed being provided by simple speed reduction gearing. It is apparent therefore that the device may be easily and quickly installed in vehicles already in use.

We claim as our invention:

1. In a fuel mileage measuring device for use in an automobile having a fuel line fed by a fuel pump and capable of feeding fuel to the line over a given pressure range while incapable of feeding fuel to said line above said pressure range, the combination comprising a fuel measuring chamber connected to said line, means including a spring pressed plunger having a low spring rate for forcing fuel from the said chamber to said line at a pressure beyond the operating range of said fuel pump, distance measuring means, means for simultaneously initiating discharge of fuel from said chamber and for initiating operation of said distance measuring means, said distance measuring means being calibrated in terms of distance per unit of fuel, and means for disabling said distance measuring means upon the exhaustion of fuel from said chamber.

2. In a fuel mileage measuring device for use in an automobile or the like having a fuel line and a source for feeding fuel to the line under pressure as well as a check valve at the source for preventing flow from said source under conditions where the pressure in the fuel line is greater than the pressure of the source, the combination comprising a fuel measuring chamber connected to said line, a piston in said chamber, a manual operator coupled to said piston for sucking fuel from said line into said chamber, a biasing spring coupled to said piston for forcing fuel from said chamber to said line at a pressure greater than that of said source, distance measuring means including an indicator and having a clutch for coupling the same to the vehicle wheels, means operated incident to completion of a full stroke of said manual operator for conditioning of said clutch so that when the manual operator is released fuel is fed from said chamber to said fuel line accompanied by engagement of said clutch for indication of the distance thereafter traversed by the automobile, and means automatically operated upon completion of the discharge stroke of said piston for disengaging said clutch so that said indicator gives direct indication of the fuel rate of the vehicle.

3. In a fuel mileage measuring device for use in an automobile or the like having a fuel line and a source for feeding fuel to the line under pressure as well as a check valve at the source for preventing flow from said source under conditions where the pressure in the fuel line is greater than the pressure of the source, the combination comprising a fuel measuring chamber connected to said line, a piston in said chamber, a manual operator coupled to said piston for sucking fuel from said line into said chamber, a low rate biasing spring coupled to said piston for forcing fuel from said chamber to said line at a pressure greater than that of said source, distance measuring means including an element rotating at a slow speed proportional to the speed of rotation of the automobile wheels, a distance indicator having a clutch for coupling the same to said rotating element, means operated upon completion of a full stroke of said manual operator for conditioning of said clutch so that when the manual operator is released fuel is fed from said chamber to said fuel line accompanied by engagement of said clutch for gradual indication of the distance thereafter traversed by the automobile, and means automatically operated upon completion of the discharge stroke of said piston for disengaging said clutch so that said indicator gives direct indication of the fuel rate of the vehicle.

4. In a fuel mileage measuring device for use in an automotive vehicle having a pressurized fuel line, the combination comprising a fuel measuring chamber, means including a T connector for coupling said measuring chamber to said pressurized fuel line, means for applying a force to the fuel in said chamber for feeding fuel from said chamber to said line via said T connection at augmented pressure which is higher than normal line pressure, means for measuring the distance traversed by said vehicle, and means for simultaneously triggering the force applying means and for turning on the measuring means for measurement of distance during the period while the fuel is fed from said chamber to said line.

5. In a fuel mileage measuring device for use in an automotive vehicle having a pressurized fuel line, the combination comprising a fuel measuring chamber connected to the fuel line, fuel control means for sucking fuel into said chamber, means for thereafter operating said fuel control means to apply a force to the fuel in said chamber for feeding fuel from said chamber to said line at augmented pressure which is higher than normal line pressure, and means for measuring the distance traversed by said vehicle during the period while fuel is fed from said chamber to said line.

References Cited in the file of this patent

UNITED STATES PATENTS

| Re. 15,651 | Struber | July 10, 1923 |
|---|---|---|
| 2,521,322 | Baadte | Sept. 5, 1950 |
| 2,652,719 | Bracci | Sept. 22, 1953 |
| 2,662,398 | Rocklen | Dec. 15, 1953 |
| 2,866,331 | Michie | Dec. 30, 1958 |